(12) United States Patent
Sato et al.

(10) Patent No.: US 6,496,311 B1
(45) Date of Patent: Dec. 17, 2002

(54) DATA RECORDING/REPRODUCING UNIT, DATA RECORDING METHOD, DATA REPRODUCING METHOD, DATA RECORDING/REPRODUCING METHOD, HARD DISK CONTROLLER, AND AV-DATA RECORDING/REPRODUCING METHOD (75) Inventors: Masahiko Sato, Yokohama (JP); Hideo Asano, Machida (JP)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 09/689,323

(22) Filed: Oct. 12, 2000

(30) Foreign Application Priority Data

Oct. 14, 1999 (JP) ............................................ 11-292908

(51) Int. Cl.$^7$ ................................................ G11B 5/09
(52) U.S. Cl. ............................ 360/48; 360/22; 386/125
(58) Field of Search ..................... 360/22, 48; 386/116, 386/125; 714/770, 769

(56) References Cited

U.S. PATENT DOCUMENTS 6,292,878 B1 * 9/2001 Morioka et al. ............. 711/209
6,308,007 B1 * 10/2001 Iwasaki ....................... 386/116

* cited by examiner

Primary Examiner—Regina N. Holder
(74) Attorney, Agent, or Firm—Paik Saber; Bracewell & Patterson, L.L.P.

(57) ABSTRACT

A method and system suitable for recording/reproducing audio-visual data on or from a hard disk or other storage media that can be accessed in random. Two streams, stream #1 and stream #2, are set. Then, 2000 sectors are set to the stream #1 and a specified number of sectors to the stream #2. By specifying this stream number (stream #1 or #2) and the audio-visual (AV) logical block address of the stream, the AV stream data recorded on the hard disk can be accessed. Each AV stream begins with zero and ends at the maximum AV stream LBA.

13 Claims, 5 Drawing Sheets

DATA RECORDING/REPRODUCING UNIT, DATA RECORDING METHOD, DATA REPRODUCING METHOD, DATA RECORDING/REPRODUCING METHOD, HARD DISK CONTROLLER, AND AV-DATA RECORDING/REPRODUCING METHOD

BACKGROUND OF THE INVENTION

1. Technical Field

The present invention relates to recording/reproducing methods for hard disk drives, and more particularly to techniques for recording and reproducing audio-visual data (hereinafter referred to as AV data).

2. Description of the Related Art

A typical storage medium to record AV data such as TV programs is magnetic tape, and video tape recorders (hereinafter referred to as VTRs) for recording AV data on this magnetic tape are widely used. VTRs are used not only for recording TV programs but also for reproducing video tape recorded movies and other programs (they are sometimes referred to as simply programs, including TV programs).

In the VTR described above, there are the following problems and demands. First, in the case where a plurality of programs have been recorded on a single video tape, fast forward or reverse winding of the tape for queueing-up of a program to be reproduced is time-consuming. This is because magnetic tape is a storage medium unsuitable for random access. Also, for example, there is a demand that while recording a TV program, viewers desire to view the recorded program from an arbitrary point, or that while recording a certain TV program, viewers desire to view another program previously recorded. Although this demand suggests the appearance of video recorders having a simultaneous recording/reproducing function, conventional VTRs are not equipped with such a function. With respect to the above problem, employing a hard disk drive, which is excellent in random access, in recording and reproducing AV data has been proposed and in some cases has been put to practical use.

AT attachment interfaces standardized by ATA standards have been designed with the primary object of handling data for computers. For this computer data, data perfection is the most important element and devices are required to maintain data as perfectly as possible.

On the other hand, application data for AV (AV data) is not required to be as perfect as computer data, but has a characteristic that a certain amount of data must be handled continuously within a predetermined time. That is, AV application data systems have no great problem even if each individual data includes an imperfect portion, but has a problem if a video stops, such that continuity in data is lost. Since AV application data is usually a group (or lump) of data arrayed continuously on a time axis, it is called a stream. Therefore, in this specification, such a data group is likewise called a stream and data included in the stream is called stream data.

In the case where AV data having such characteristics are recorded and reproduced by employing conventional hard disk drives, the conventional hard disk drives cannot satisfy a user's operability requirements because such drives have been designed for reading out or writing data suitable for computers.

Accordingly, it is an object of the present invention to provide a data recording/reproducing unit, a data recording/reproducing method, and a hard disk controller suitable for recording/reproducing AV data on or from a hard disk or other storage media that can be accessed randomly.

SUMMARY OF THE INVENTION

The present invention is characterized in that it enhances user friendliness in handing AV data, by defining regions, on which a stream, i.e., a lump of data continuous in a time-series manner is recorded, on a hard disk and accessing that data lump in the unit of the recording region. That is, the data recording/reproducing unit of the present invention comprises: a randomly accessible hard disk on which a lump of data continuous in a time-series manner is recorded; recording-region setting means for defining a plurality of recording regions for the data lump with respect to the hard disk and allocating sectors to each of the recording regions, the sectors being given consecutive numbers; and a controller for controlling recording/reproduction of the data lump with respect to the hard disk by specifying the recording region and the sectors.

Accordingly, the data recording/reproducing unit of the present invention, recording or reproduction of data, for example, TV programs, can be executed, by specifying the aforementioned recording regions and sectors. Also, in the data recording/reproducing unit of the present invention, a plurality of recording areas are defined. For example, in the case of two recording regions, the process of recording a video on one recording region and the process of reproducing another video from another recording region can be performed in parallel.

In the data recording/reproducing unit of the present invention, the recording/reproduction of data is performed in the order of the numbers of the sectors, given the consecutive numbers. More specifically, when recording data, the data is written in the order of the sector having a smaller number, and in reproducing data, the data is read out in the order of the sector having a smaller number.

Here, in conventional hard disks, the sectors are given logical consecutive numbers beginning with zero, i.e., logical block addresses (LBAs), respectively. However, the recording regions and sectors of the present invention are provided separately from conventional LBAs. Note that in the present invention, the consecutive numbers given to the sectors are called stream LBAs.

In accordance with the present invention, there is provided a data recording method comprising the steps of: developing a data stream on a data storage medium accessible in random, the data stream being a unit in which a group of data continuous along a time axis is recorded; allocating to the data stream a plurality of sectors given consecutive numbers; and specifying the number of the sector at which writing of the data is started, and then writing the data to the sectors in the order of the consecutive numbers. In this data recording method, a single stream may be developed on the storage medium, however, there is a need to develop a plurality of data streams in order to execute simultaneous recording-reproduction described previously. In addition, if a plurality of data streams are present, different groups of data can be recorded in the same time period on one data stream and another data stream of the plurality of data streams, respectively. In recording/reproducing AV data, there is a need to transfer 1.5 M bytes of data for each 0.5 seconds. If we assume the data transfer capability of the interface of a hard disk drive is 3 M byte/s, it becomes possible to record different groups of data in the same time period, by alternately performing the process of writing one group of data to one data stream at a rate of 1.5 M bytes/sec and the process of writing the other group of data to another data stream at a rate of 1.5 M bytes/sec.

In accordance with the present invention, there is provided a data recording method comprising the steps of: developing a plurality of data streams accessible at random, the data streams being units in which a group of data continuous along a time axis is recorded; giving a number to each of the plurality of data streams developed on the data storage medium on a data storage medium; allocating to each data stream a plurality of sectors given consecutive numbers; and writing the data group to the sectors in the order of the consecutive numbers, and if another group of data is present continuously after the writing of the data group reaches the sector of the last number of the consecutive numbers, writing the other data group in sequence from its sector given the first number of the consecutive numbers. In the case where recording is performed up to the last data stream LBA when AV stream data is not completed, i.e., when a TV program is being recorded, this data recording method records the TV program continuously from the first data stream LBA. In this specification, this recording is called seamless recording.

In accordance with the present invention, there is also provided, in a method of reading out data from a storage medium on which a plurality of data streams have been recorded in data stream units, each data stream being a group of data continuous along a time axis, a data reproducing method, comprising the steps of: specifying a data stream on which data to be reproduced has been recorded; specifying a start position in the specified data stream at which the data is read out; and starting reading of the data from the specified position. In this data reproducing method, the data stream is divided into micro-units having a predetermined capacity, and each micro-unit is given consecutive numbers. Specification of the start position at which the data is reproduced can be performed by specifying the number. The number given to the micro-unit refers to the data stream LBA.

In accordance with the present invention, there is also provided a method of reading out data from a storage medium on which a plurality of data streams have been recorded in data stream units, each data stream being a group of data continuous along a time axis, the method comprising the steps of: specifying a data stream on which data to be reproduced has been recorded; specifying a start position in the specified data stream at which the data is read out; and starting reading of the data from the specified position, and after the reading of the data has reached the end point of the data stream, reading out data in sequence from the start point of the data stream. In the case where reproduction is performed up to the last data stream LBA during reproduction of a recorded TV program, this data reproducing method performs reproduction continuously from the first data stream LBA. In this specification, this reproduction is called seamless reproduction.

While recording of data and reproduction of data have been described separately, the present invention includes the process of recording data and the process of reproducing data in parallel. That is, in accordance with the present invention, there is provided a data recording/reproducing method comprising: a writing process having (a) a step of developing a plurality of data streams on a data storage medium accessible in random, the data streams being units in which a group of data continuous along a time axis is recorded, (b) a step of allocating to each data stream a plurality of sectors given consecutive numbers, and (c) a step of writing data to the sectors in the order of the consecutive numbers; and a reading process having (a) a step of specifying the data stream on which data to be reproduced has been recorded, (b) a step of specifying a start position in the specified data stream at which data is read out, and (c) a step of starting reading of data from the specified position; wherein the writing process and the reading process are executed in parallel.

The present invention is also executed as the data recording-reproducing method, as described above. However, the invention may be carried out as a controller for hard disk drives. Therefore, in accordance with the present invention, there is provided a hard disk controller for controlling reading and writing of data with respect to a hard disk drive, the hard disk controller comprising: recording-region setting means for defining a plurality of recording regions, on which a lump of data is recorded, with respect to a hard disk and allocating to each recording region a plurality of sectors given consecutive numbers; and data specification means for specifying data which is to be read out from or written to the hard disk, by specifying the recording region and the sectors.

Furthermore, the present invention may also be executed as a method of recording/reproducing a group of audio-visual data. Therefore, there is provided a method comprising the steps of: developing a plurality of data streams on a data storage medium accessible in random, the data streams being units in which the audio-visual data group is recorded; dividing each of a plurality recording regions into predetermined recording units; and performing recording/reproduction of the audio-visual data group for each recording region.

BRIEF DESCRIPTION OF THE DRAWINGS

The novel features believed characterics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

The preferred embodiment of the present invention will hereinafter be described in detail with reference to the accompanying drawings.

Figure 2:
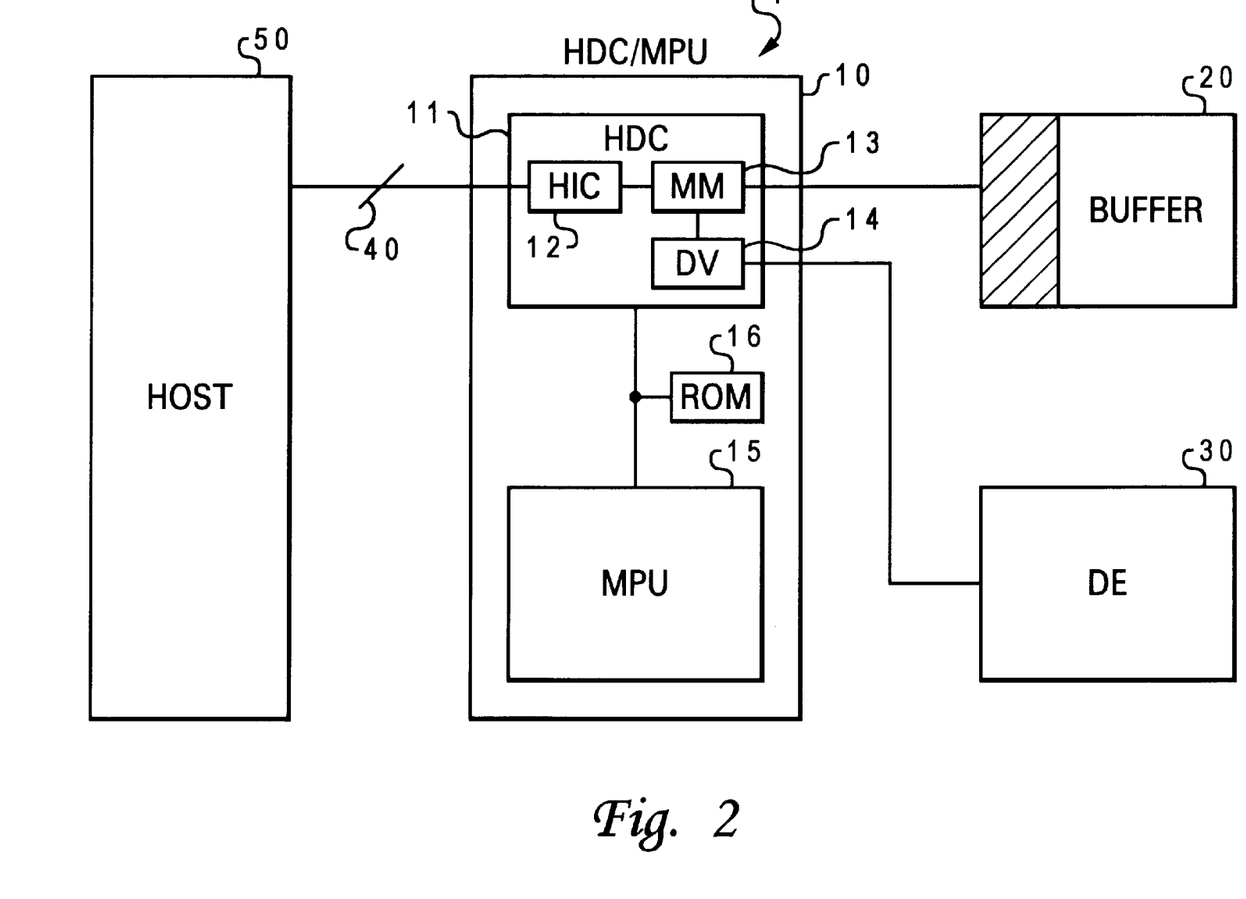
FIG. 2 is a block diagram of a disk drive for carrying out the present invention.

FIG. 2 shows a block diagram of a disk drive 1 for carrying out the present invention.

In the figure, disk drive 1 is constituted by a HDC/MPU 10, which consists of a hard disk controller (HDC) and a microprocessor unit (MPU), a buffer 20, and a disk enclosure (DE) 30. HDC/MPU 10 is connected to a host 5 through an ATA interface (ATA I/F) 40.

HDC 11 in HDC/MPU 10 is equipped with a host interface controller (HIC) 12, a memory manager (MM) 13, and a drive controller (DV) 14. HDC 11 and the MPU 15 are connected as shown in FIG. 2 and a read-only memory (ROM) 16 is interposed therebetween. Within 30, hard disks (or magnetic disks) for recording data and magnetic heads for reading out from or writing data to the hard disks are disposed.

When disk drive 1 performs writing of data, the data being transferred through ATA I/F 40 from host 50 is temporarily stored in buffer 20 via HIC 12 and MM 13. Thereafter, the temporarily stored data is written to the aforementioned hard disk in DE 30 via MM 13 and DV 14 by an instruction from MPU 15. When reading out data stored in the hard disk, the data is temporarily stored in buffer 20 via DV 14 and MM 13 by an instruction from MPU 15, and thereafter, the data is output to host 50 via MM 13 and HIC 12.

A command for carrying out the present invention, which will be described later, is stored in ROM 16 as a micro code. This micro code can be stored not only in ROM 16 but also in part of buffer 20.

Figure 1:
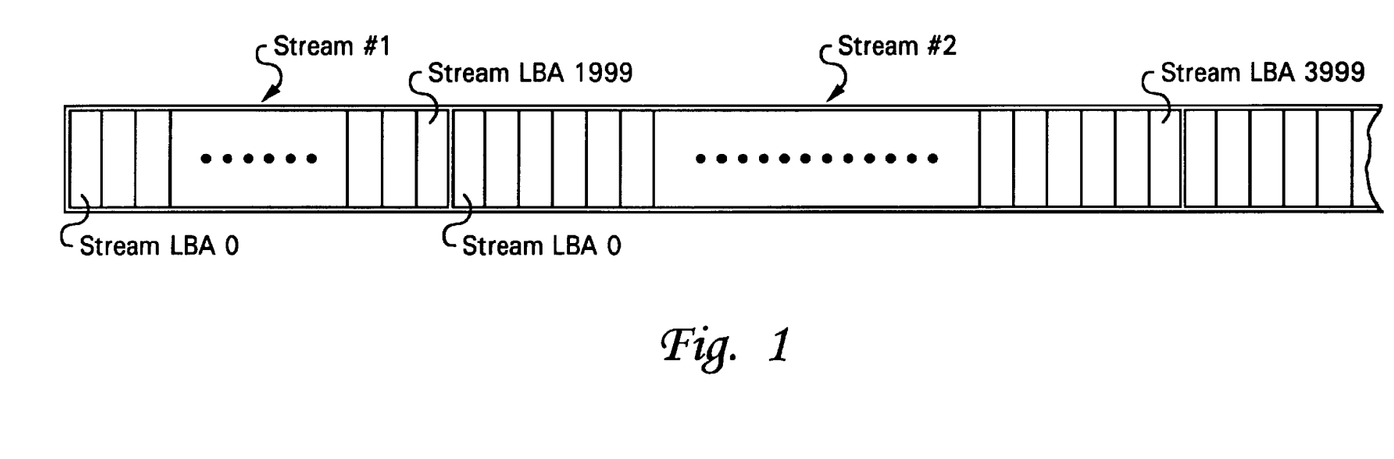
FIG. 1 is a schematic diagram for describing the concept of the present invention.

An AV stream LBA is used for specifying a logical address in AV stream data. First, MPU 15 of HDC/MPU 10 sets the number of streams and the capacity that each stream handles, based on an instruction from host 50. MPU 15 then allocates physical sectors to each stream. As a result, host 50 can have access to the AV stream data by the AV stream LBA. For example, as shown in FIG. 1, two stream numbers, stream #1 and stream #2, are set. Then, 2000 sectors are allocated to stream #1 and 4000 sectors are allocated to stream #2. In this condition, host 50 can have access to AV stream data recorded on the hard disk in DE 30 by specifying the AV stream number (#1 or #2) and the AV stream LBA, and executes recording/reproduction of data by control of MPU 15. The AV stream LBA begins with 0 (zero) for each AV stream and completes at the maximum AV stream LBA of each stream. For instance, in the above example, as shown in FIG. 1, stream #1 has stream LBA 0 to stream LBA 1999 and stream #2 has stream LBA 0 to stream LBA 3999. Each AV stream LBA in stream #1 is disposed at a position differing from the physical sector of each AV stream LBA in stream #2. With AV stream LBA, host 50 can easily access AV stream data that is a group of data. Note that while, in this example, two streams have been described, the present invention is not to be limited to two. Also, by providing a plurality of streams in this way, recording/reproduction of AV data can be processed in parallel, as described previously. In addition, for example, in the case where a plurality of tuners are present on the side of host 50, it becomes easy to process a plurality of recordings and reproductions in parallel.

As described above, an AV stream data is usually a lump of data in which a start point and an end point are prescribed. Host 50 accesses AV stream data from the AV stream LBA next to the preceding access. In order for an AV stream command to access the next sequential, i.e., continuous data, host 50 needs to set how many sectors the AV stream needs. HDC/MPU 10 makes preparations so that host 50 can access an adequate number of LBAs for the next AV stream data group.

In certain cases, host 50 accesses a stream LBA given number 0 from a stream LBA given the maximum number at the intermediate stage that the AV stream data has not completed. In AV stream data, a stream LBA given number 0 does not always refer to the start point of the AV stream data, and a stream LBA given the maximum number does not always mean the end point of the AV stream data. In this case host 50 can continuously access an AV stream data without performing a special process on the boundary between 0 stream LBA and the maximum stream LBA. The AV stream command to be described later provides this type of access to host 50. For example, assume that the capacity of stream #1 is 2000. If an AV stream command, which indicates that the number of sectors for stream #1 is 200, is sent when host 50 has already accessed AV stream data up to 1899 of stream #1, the HDC/MPU 10 transfers data from 0 to 99, following after the AV stream data from 1900 to 1999 in stream #1. This processing realizes the aforementioned seamless recording and seamless reproduction.

The following description is based on the assumption that an AT attachment prescribed by known ATA standards is employed as an interface. Therefore, terms employed in the following description conform to ATA standards.

To apply AV stream LBAs to an AT attachment interface HDD (Hard Disk Drive), the setting of host protect area features is necessary. AV stream LBAs are allocated to a host protect area as an AV stream area in which AV stream data is stored. An address space other than the host protect area that users can access is used as a program data area in which a system program is stored. Therefore, host 50 must set a host protect area (auxiliary area) before using AV stream LBAs.

In an AV stream area, AV stream LBAs are used for accessing stream data and are independent of one another for each data stream. In other words, AV stream LBAs are allocated 0 to the maximum number for each data stream, respectively. Each of the maximum AV stream LBAs is set in an AV stream mode by an AV stream number and a set max address command. The disposition of AV stream LBAs is determined according to devices. If a host protect area is changed, or if the number of AV streams is changed, setting of an AV stream area is cleared and all the stream data is lost.

The commands required for executing the present invention in an AT attachment interface HDD meeting ATA standard requirements are a set AV stream features command, a set AV stream max address command, a read AV stream max address command, an identify device command, a read AV stream command, a write AV stream command, a read AV stream next command, and a write AV stream next command. These are extension of the functions of the commands present in ATA standards, or new commands. For a more detailed discussion on ATA standards, see "AT attachment with Packet Interface-5 (ATA/ATAPI-5)," Doc. No. T13/1321D.

The content of each command will hereinafter be described.

Set AV Stream Features Command

To set the HDD for AV stream features so that AV data is processed, host 50 sets the AV stream features by a set features command which either causes the HDD to go to an AV stream mode or releases that mode. This is executed by a subcommand of the set features command defined by "EFh." The set features command is executed by writing a predetermined value to a features resister on the hard disk.

Subcommand 0Ah is allocated to an enable AV stream mode, while subcommand 8Ah is allocated to a disable AV stream mode.

Host 50 makes the AV stream mode valid in order to use stream commands for AV data. At this time, the number of streams is written to a sector count register on the hard disk. The number of streams is expressed by a total of 3 data bits, which consists of a data bit 0, a data bit 1, and a data bit 2 (stated as (2:0) in ATA standards). This applies correspondingly to the following cases. When a data bit 2, a data bit 1, and a data bit 0 are all 0's, no stream is handled and therefore the number of streams can be set in the range of 1 to 7, or $2^3 - 1$. For instance, if the number of streams is set to 3, AV stream data can be handled as valid in stream #1, stream #2, and stream #3. When the number of streams is 0 (zero), the command is ignored and the AV mode does not function.

The disable AV stream mode is issued by the subcommand 8Ah, and releases the AV stream mode if the subcommand 8Ah is instructed when the AV stream mode is set, i.e., valid. This disable AV stream mode can be employed, for example, in the case where data other than AV stream data, for example, program data is stored in the hard disk, when the AV stream mode is valid.

Note that in the case where the hard disk is employed exclusively for AV stream data, the disable AV stream mode is not needed.

Set AV Stream Max Address Command

As a command for ATA interfaces, there is a set max address command to set the size of the entire hard disk. This command is defined by "F9h." This command is extended to define the set AV stream max address command for setting the size of an AV stream. The set AV stream max address command functions only when the AV stream mode is valid, and sets the maximum AV stream LBA of each stream to all the streams.

In this command, a features register, a sector count register, a sector number register, a cylinder low register, a cylinder high register, and a device/head register are used as follows:

(1) Features Register

An AV stream number, which is a number in the range of 3 data bits (2:0), indicates an AV stream that is processed by this command. This functions only when the AV stream mode is valid. When the AV stream number is 0 (zero), this command is invalid and ignored.

(2) Sector Count Register

The sector count register can set whether or not the setting by the set max address command is valid after power is turned off. In other words, if the data bit 0 (zero) for the sector count register is set to a 1, information is maintained even after power is turned off. Considering the form of use of AV stream data, it is desirable to maintain the data even after power is turned off and therefore the data bit 0 (zero) for the sector count register is set to a 1.

(3) Sector Number Register, Cylinder Low Register, Cylinder High Register, and Device/Head Register Next, the maximum value of the AV stream LBAs in the steam of the stream number, set to the features register, is set to the sector number register, the cylinder low register, the cylinder high register, and the device/head register. More specifically, the maximum value of the LBA on the existing ATA interface is 28 bits, and the 28 bits are divided among the sector number register, the cylinder low register, the cylinder high register, and the device/head register. That is, among 28 bits, 8 bits in the range of (7:0) are set to the sector number register; 8 bits in the range of (15:8) are set to the cylinder low register; 8 bits in the range of (23:16) are set to the cylinder high register; and 4 bits in the range of (27:24) are set to the device/head register. Note that the device/head register is allocated 4 lower bits in the range of (3:0) for a head and 4 higher bits in the range of (7:4) for a device, but the 4 bits in the range of (3:0), among these bits, are allocated the aforementioned 4 bits in the range of (27:24).

(4) Error Register

The data bit 2 for the error register is set to a 1 in the case where the AV stream mode has been released, or in the case where the AV stream number, set to the aforementioned features register in the range of 3 data bits (2:0) at the time of input, is invalid, for example, greater than the number of streams set in the aforementioned enable AV stream mode.

<Read AV Stream Max Address Command>

As a command for ATA interfaces, there is a read native max address command, defined by "F8h," which can know the size of the entire hard disk. This command is extended to define the read AV stream max address command in order for users to know the size of an AV stream, i.e., the maximum AV stream LBA. This command is also valid only when the AV stream mode is valid.

Registers Which are Used Differently from the Read Native Max Address Command are as Follows:

(1) Features Register

The AV stream number, which is a number in the range of 3 data bits (2:0), indicates an AV stream that is processed by this command. This command functions only when the AV stream mode is valid. In the AV stream mode, setting the AV stream number to a 0 refers to a conventional read max address command for reading the maximum cylinder or LBA of a device.

(2) Device/Head Register

When the AV stream mode is valid, the data bit 6 is set to a 1.

(3) Sector Number Register, Cylinder Low Register, Cylinder High Register, and Device/Head Register If a stream number is set to the aforementioned features register, an AV stream max LBA is obtained as its output. The AV stream max LBA, as with the aforementioned set AV stream max address command, is allocated a total of 28 bits. That is, 8 bits in the range of (7:0) are set to the sector number register, 8 bits in the range of (15:8) are set to the cylinder low register, 8 bits in the range of (23:16) are set to the cylinder high register, and 4 bits in the range of (27:24) are set to the device/head register.

(4) Error Register

When the AV stream mode is invalid, the data bit 2 for the error register is set to a 1.

<Identify Device Command>

This command is a command for informing host 50 of a situation related to an AV stream in the hard disk. An identify device command for informing a hard disk attribute is present on the ATA interface. This command is defined by "EFh" and sends a hard disk attribute back to host 50 as identify device information. This identify device information contains a situation related to an AV stream.

The aforementioned identify device information is constituted by a 1-sector (or 512-byte) data format and uses 512 bytes in the unit of a data word. The identify device information is given data words 0 to 255, from the first data word. The data bit 7 in the 83rd data word (i.e., data word 83) represents whether or not AV stream features have been set. Also, the data bit 7 in the data word 86 represents whether or not the AV stream mode is valid. Furthermore, the 3 data bits (2:0) in data word 95 represent the number of the current AV streams.

<Read AV Stream Command>

This command is a command to read AV stream data recorded on the hard disk. This command is executed by a read direct-memory-access (DMA) command and a read DMA queued command, defined by the ATA interface.

To read AV data, host 50 uses the read AV stream command. With this command, the HDD reads the requested data as AV data, in accordance with the AV stream function, set by the set features command and the set max address command. The read AV stream command is a command in which any of AV stream numbers 1 to 7 is added to the aforementioned read DMA command, when the AV stream mode is valid. This command supports the LBA mode only. Setting the AV stream number to a 0, when the AV stream mode is valid, means that the HDD processes this command as an ordinary read DMA command, not as the read AV stream command.

The read DMA command, which is defined by "C8h" in ATA, and the read DMA queued command, which is defined by "C7h," are interpreted as read AV stream commands, when the AV stream mode is valid and when the AV stream number is not zero.

Registers that are used differently from usual by the read DMA command (C8h) are as follows:

(1) Features Register

The AV stream number, which is a number in the range of 3 data bits (2:0), indicates by this command which AV stream is processed. This is valid only when the AV stream mode is valid. Setting the AV stream number to a 0 means that this command is not an AV stream command.

(2) Device/Head Register

If this command is an AV stream command, the data bit 6 is set to a 1.

Registers that are used differently from usual by the read DMA queued command (C7h) are as follows:

(1) Sector Count Register

The AV stream number, which is a number in the range of 3 data bits (2:0), indicates by this command which AV stream is processed. This is valid only when the AV stream mode is valid. Setting the AV stream number to a 0 means that this command is not an AV stream command.

(2) Device/Head Register

If this command is an AV stream command, the data bit 6 is set to a 1.

<Write AV Stream Command>

This command is a command to write AV stream data to the hard disk. This command is executed by a write DMA command and a write DMA queued command, defined by the ATA interface.

To write AV data, host 50 uses the write AV stream command. With this command, the HDD writes the requested data as AV data, in accordance with the AV stream function, set by the set features command and the set max address command.

The write AV stream command is a command in which any of AV stream numbers 1 to 7 is added to the aforementioned write DMA command, when the AV stream mode is valid. This command supports only the LBA mode. Setting the AV stream number to a 0, when the AV stream mode is valid, means that the HDD processes this command as an ordinary write DMA command, not as the write AV stream command.

The write DMA command, which is defined by "CAh" in ATA, and the write DMA queued command, which is defined by "CCh," are interpreted as write AV stream commands, when the AV stream mode is valid and when the AV stream number is not zero.

Registers that are used differently from usual by the write DMA command (CAh) are as follows:

(1) Features Register

The AV stream number, which is a number in the range of 3 data bits (2:0), indicates by this command which AV stream is processed. This is valid only when the AV stream mode is valid. Setting the AV stream number to a 0 means that this command is not an AV stream command.

(2) Device/Head Register

If this command is an AV stream command, the data bit 6 is set to a 1.

(3) Error Register

When the writing process ends incompletely with respect to the proceeding commands accumulated, a data bit 0 is set.

Registers that are used differently from usual by the write DMA queued command (CCh) are as follows:

(1) Sector Count Register

The AV stream number, which is a number in the range of 3 data bits (2:0), indicates by this command which AV stream is processed. This is valid only when the AV stream mode is valid. Setting the AV stream number to a 0 means that this command is not an AV stream command.

(2) Device/Head Register

If this command is an AV stream command, the data bit 6 is set to a 1.

Error output is performed in an Error Register as follows:

(3) Error Register

When the writing process ends incompletely with respect to the proceeding commands accumulated, a data bit 0 is set.

<Read AV Stream Next Command>

With this command, host 50 can read AV stream data, by using a DMA transfer protocol and without setting the start AV stream LBA. The device reads data from the AV stream LBA next to the last AV stream LBA of the previous read AV stream command. These AV stream LBAs belong to the same AV stream number defined by the 3 data bits (2:0) in the features register. If a command is the first command with respect to an AV stream defined after the AV stream mode has become valid, in the case where the previous read AV stream command is not present, the device ignores this command. When the host 50 reads AV stream data according to this command, the device reads the last AV stream LBA of the AV stream and then returns to the first AV stream LBA. That is, this command is a command that makes seamless reproduction possible.

This command is defined by "CEh." Input is performed as follows:

(1) Features Register

The AV stream number, which is a number in the range of 3 data bits (2:0), indicates by this command which AV stream is processed. This is valid only when the AV stream mode is valid. Setting the AV stream number to a 0 means that this command is not an AV stream command.

(2) Device/Head Register

The data bit 6 is set to a 1.

<Write AV Stream Next Command>

With this command, the host 50 is able to write AV stream data, by using a DMA transfer protocol and without setting the start AV stream LBA. The device writes data from the AV stream LBA next to the last AV stream LBA of the previous write AV stream command. These AV stream LBAs belong to the same AV stream number defined by the 3 data bits (2:0) in the features register. If a command is the first command with respect to an AV stream defined after the AV stream mode has become valid, in the case where the previous write AV stream command is not present, the device ignores this command. When the host 50 writes AV stream data according to this command, the device writes the last AV stream LBA of the AV stream and then returns to the first AV stream LBA. That is, this command is a command that makes seamless recording possible.

This command is defined by "CFh." Input is performed as follows:

(1) Features Register

The AV stream number, which is a number in the range of 3 data bits (2:0), indicates by this command which AV stream is processed. This is valid only when the AV stream mode is valid. Setting the AV stream number to a 0 means that this command is not an AV stream command.

(2) Device/Head Register

The data bit 6 is set to a 1.

Also, error output is performed as follows:

(3) Error Register

When the writing process ends incompletely with respect to the proceeding commands accumulated, a data bit 6 is set.

An example of flow in performing the initialization, reading, and writing of an AV stream by the aforementioned commands will be described based on FIGS. 3 to 5.

Figure 3:
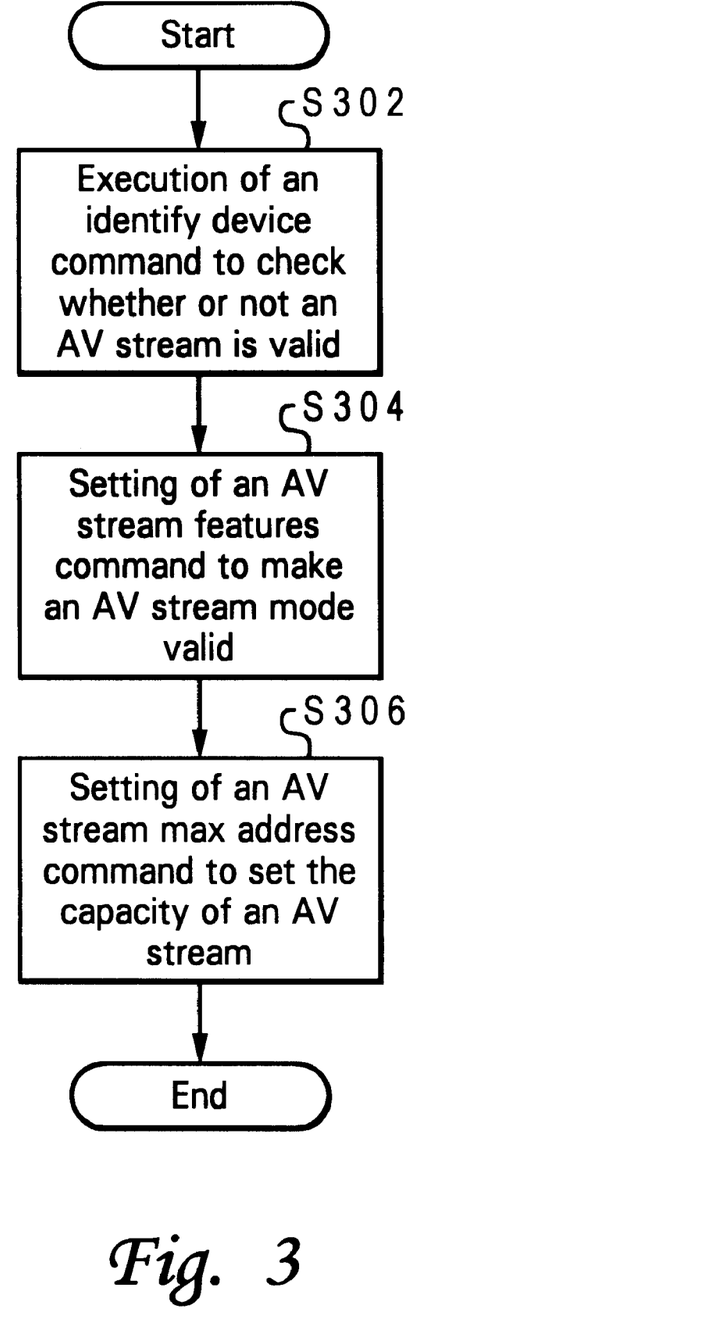
FIG. 3 is a flow diagram showing the initialization of the hard disk in a preferred embodiment of the present invention.

FIG. 3 is a flow diagram showing the initialization of an AV stream. First, in step S302, the identify device command, which checks whether or not an AV stream is valid, is executed. Then, in step S304, the AV stream features command, for making the AV stream valid, is set. Finally, in step S306, the AV stream max address, which sets the capacity of the AV stream, is set.

Figure 4:
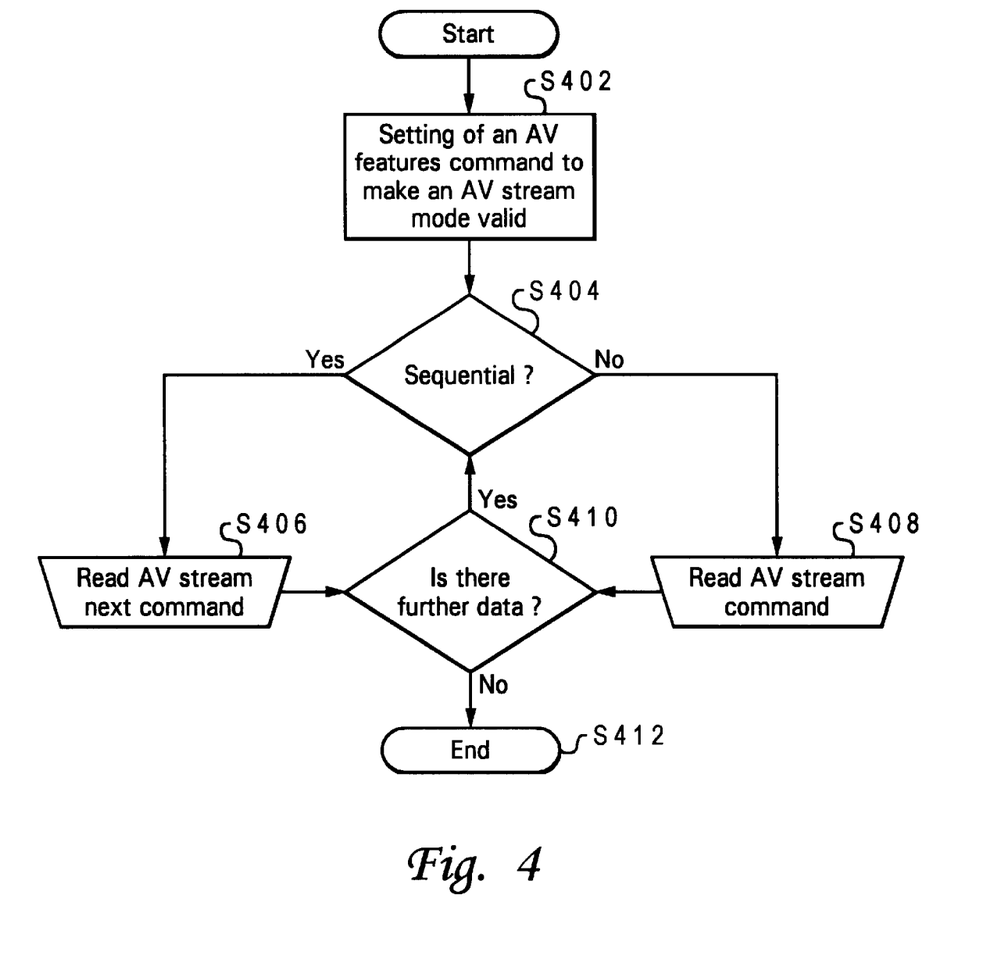
FIG. 4 is a flow diagram showing how data is read out by the hard disk.

FIG. 4 is a flow diagram showing how AV stream data is read out. First, in step S402 the AV features command is set in order to make the AV stream mode valid. Then, in step S404 it is judged whether or not the data is sequential. If it is sequential, in step S406 the read AV stream next command is executed. If it is not sequential, in step S408 the read AV stream command is executed. Next, in step S410 it is judged whether or not there is data to be read out. If there is data to be read out, the process returns to step S404 and it is judged whether or not the data is sequential. If there is no data, in step S412 the reading of data ends.

Figure 5:
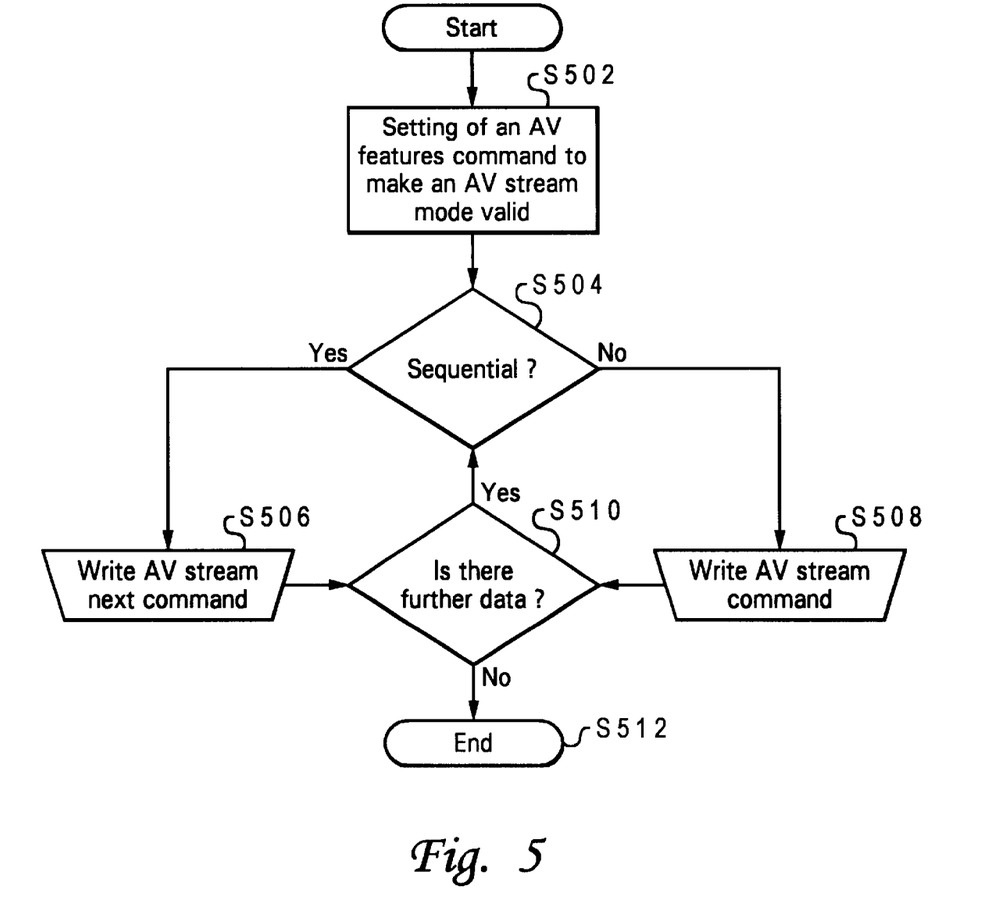
FIG. 5 is a flow diagram showing how data is written by the hard disk.

FIG. 5 is a flow diagram showing how AV stream data is written in. First, in step S502 the AV features command is set in order to make the AV stream mode valid. Then, in step S504 it is judged whether or not the data is sequential. If it is sequential, in step S506 the write AV stream next command is executed. If it is not sequential, in step S508 the write AV stream command is executed. Next, in step S510 it is judged whether or not there is data to be written in. If there is data to be written in, the process returns to step S504 and it is judged whether or not the data is sequential. If there is no data to be wrtten in, in step S512 the writing of data ends.

As has been described hereinbefore, the present invention is capable of providing a data recording/reproducing unit, data recording and reproducing methods, etc., which are suitable for recording/reproducing AV data on or from a hard disk or other storage media that can be accessed in random. The data recording/reproducing unit, etc., enhance users' operability and make a contribution to further spread of AV applications.

While the invention has been particularly shown and described with reference to a preferred embodiment, it will be understood by those skilled in the art that various changes in form and detail may be made therein without departing from the spirit and scope of the invention.

What is claimed is:

1. A data recording/reproducing unit, comprising:
a single randomly accessible hard disk on which a lump of data continuous in a time-series manner is recorded;
recording-region setting means for defining a plurality of recording regions for said data lump with respect to said hard disk and allocating sectors to each of said recording regions, said sectors being given consecutive numbers; and
a controller for controlling recording/reproduction of said data lump with respect to said hard disk by specifying said recording region and said sectors.

2. The data recording/reproducing unit as set forth in claim 1, wherein the recording/reproduction of said data lump is performed in the order of the numbers of the sectors given said consecutive numbers.

3. The data recording/reproducing unit as set forth in claim 1, wherein said recording regions and said sectors are provided separately from logical block addresses of said hard disk.

4. A data recording method comprising the steps of:
developing a stream on a single data storage medium accessible in random, said stream being a unit in which a group of data continuous along a time axis is recorded;
allocating to said stream a plurality of sectors given consecutive numbers; and
specifying the number of said sector at which writing of said data group is started, and then writing said data group to said sectors in the order of said consecutive numbers.

5. The data recording method as set forth in claim 4, wherein said plurality of streams are developed on said data recording medium.

6. The data recording method as set forth in claim 5, wherein different groups of data are recorded at the same time zone on one stream and another stream of said plurality of streams, respectively.

7. A data recording method, comprising the steps of:

developing a plurality of streams on a single data storage medium accessible in random, said streams being units in which a group of data continuous along a time axis is recorded;

giving each of said plurality of streams a number;

allocating to each stream a plurality of sectors given consecutive numbers; and writing said data group to said sectors in the order of said consecutive numbers, and if another group of data is present continuously after the writing of said data group reaches the sector of the last number of said consecutive numbers, writing the other data group in sequence from its sector given the first number of said consecutive numbers.

8. In a method of reading out data from a single storage medium on which a plurality of streams have been recorded in stream units, each stream being a group of data continuous along a time axis;

a data reproducing method, comprising the steps of:
specifying a stream on which data to be reproduced has been recorded;
specifying a start position in the specified stream at which said data is read out; and
starting reading of said data from the specified position.

9. The data reproducing method as set forth in claim 8, wherein said stream is divided into micro-units having a predetermined capacity, each micro-unit is given consecutive numbers, and specification of said start position is performed by specifying the number.

10. In a method of reading out data from a single storage medium on which a plurality of streams have been recorded in stream units, each stream being a group of data continuous along a time axis, a data reproducing method, comprising the steps of:
specifying a stream on which data to be reproduced has been recorded;
specifying a start position in the specified stream at which said data is read out; and
starting reading of said data from the specified position, and after the reading of said data has reached the end point of said stream, reading out data in sequence from the start point of said stream.

11. A data recording/reproducing method, comprising:

a writing process having (a) a step of developing a plurality of streams on a single data storage medium accessible in random, said streams being units in which a group of data continuous along a time axis is recorded, (b) a step of allocating to each stream a plurality of sectors given consecutive numbers, and (c) a step of writing data to said sectors in the order of said consecutive numbers; and a reading process having (a) a step of specifying said stream on which data to be reproduced has been recorded, (b) a step of specifying a start position in the specified stream at which data is read out, and (c) a step of starting reading of data from the specified position;

wherein said writing process and said reading process are executed in parallel.

12. A hard disk controller for controlling reading and writing of data with respect to a hard disk drive, the hard disk controller, comprising:

recording-region setting means for defining a plurality of recording regions, on which a lump of data continuous in a time-series manner is recorded, with respect to a hard disk accessible in random and allocating to each recording region a plurality of sectors given consecutive numbers; and data specification means for specifying data which is to be read out from or written to said hard disk, by specifying said recording region and said sectors.

13. A method of recording/reproducing a group of audio-visual data, comprising the steps of:

developing a plurality of streams on a single data storage medium accessible in random, said streams being units in which said audio-visual data group is recorded;

dividing each of a plurality recording regions into predetermined recording units; and performing recording or reproduction of said audio-visual data group for each recording region.

* * * * *